US012694094B2

(12) United States Patent
Kale et al.

(10) Patent No.: US 12,694,094 B2
(45) Date of Patent: Jul. 28, 2026

(54) SYSTEM AND METHOD FOR ADVANCED COUNTERMEASURES AGAINST PROMPT INJECTION ATTACKS IN LARGE LANGUAGE MODELS

(71) Applicant: Cisco Technology, Inc., San Jose, CA (US)

(72) Inventors: Nikhil Sainath Kale, Marina, CA (US); John H. Hess, III, Phoenix, AZ (US); Shankar Ramanathan, Allen, TX (US); Foster G. Lipkey, New Market, MD (US); John J. Groetzinger, Baltimore, MD (US)

(73) Assignee: Cisco Technology, Inc., San Jose, CA (US)

( * ) Notice: Subject to any disclaimer, the term of this patent is extended or adjusted under 35 U.S.C. 154(b) by 128 days.

(21) Appl. No.: 18/651,087

(22) Filed: Apr. 30, 2024

(65) Prior Publication Data

US 2025/0335573 A1      Oct. 30, 2025

(51) Int. Cl.
G06F 21/00      (2013.01)
G06F 21/52      (2013.01)
G06F 21/55      (2013.01)

(52) U.S. Cl.
CPC ............ G06F 21/52 (2013.01); G06F 21/554 (2013.01); *G06F 2221/033* (2013.01)

(58) Field of Classification Search
CPC ... G06F 21/52; G06F 21/554; G06F 2221/033
See application file for complete search history.

(56) References Cited

U.S. PATENT DOCUMENTS

| | | | | |
|---|---|---|---|---|
| 11,972,211 | B1 * | 4/2024 | Singh | ...................... G06N 3/08 |
| 12,111,747 | B1 * | 10/2024 | Jain | ...................... G06N 3/0455 |
| 2021/0263924 | A1 | 8/2021 | Klein | |
| 2022/0272121 | A1 | 8/2022 | Alberstein | |
| 2023/0185899 | A1 | 6/2023 | Bendanan et al. | |

(Continued)

FOREIGN PATENT DOCUMENTS

| | | | |
|---|---|---|---|
| CN | 114598526 A | | 6/2022 |
| CN | 118410522 | * | 7/2024 |

OTHER PUBLICATIONS

Du W., et al., "PPT: Backdoor Attacks on Pre-Trained Models via Poisoned Prompt Tuning", Proceedings of the Thirty-First International Joint Conference on Artificial Intelligence (IJCAI-22), 2022, pp. 680-686.

(Continued)

*Primary Examiner* — Ghazal B Shehni
(74) *Attorney, Agent, or Firm* — Baker Botts L.L.P.

(57)      ABSTRACT

In an embodiment, a method includes receiving a prompt provided to a large language model (LLM), generating a semantic fingerprint for the prompt based on semantic and syntactic features associated with the prompt, generating a vector representation incorporating the semantic fingerprint for the prompt, calculating semantic distances between the vector representation and multiple vector representations associated with multiple malicious intents, determining an intent associated with the prompt based on the semantic distances, and determining a defense action on the prompt based on the intent and multiple policies to mitigate a security risk associated with the prompt.

20 Claims, 5 Drawing Sheets

(56) References Cited

U.S. PATENT DOCUMENTS

| | | | |
|---|---|---|---|
| 2024/0054233 A1 | 2/2024 | Ohayon et al. | |
| 2024/0320251 A1* | 9/2024 | Hemington | G06F 16/35 |
| 2025/0028904 A1* | 1/2025 | Palatnik de Sousa | G06F 40/30 |

OTHER PUBLICATIONS

Liu Y., et al., "Prompt Injection Attack against LLM-Integrated Applications", arXiv:2306.05499v2 [cs.CR] Mar. 2, 2024, pp. 1-18.
Yu X., et al., "Improving the Semantic Consistency of Textual Adversarial Attacks via Prompt", 2022 International Joint Conference on Neural Networks (IJCNN), 2022, 8 Pages, DOI: 10.1109/IJCNN55064.2022.9892715.

* cited by examiner

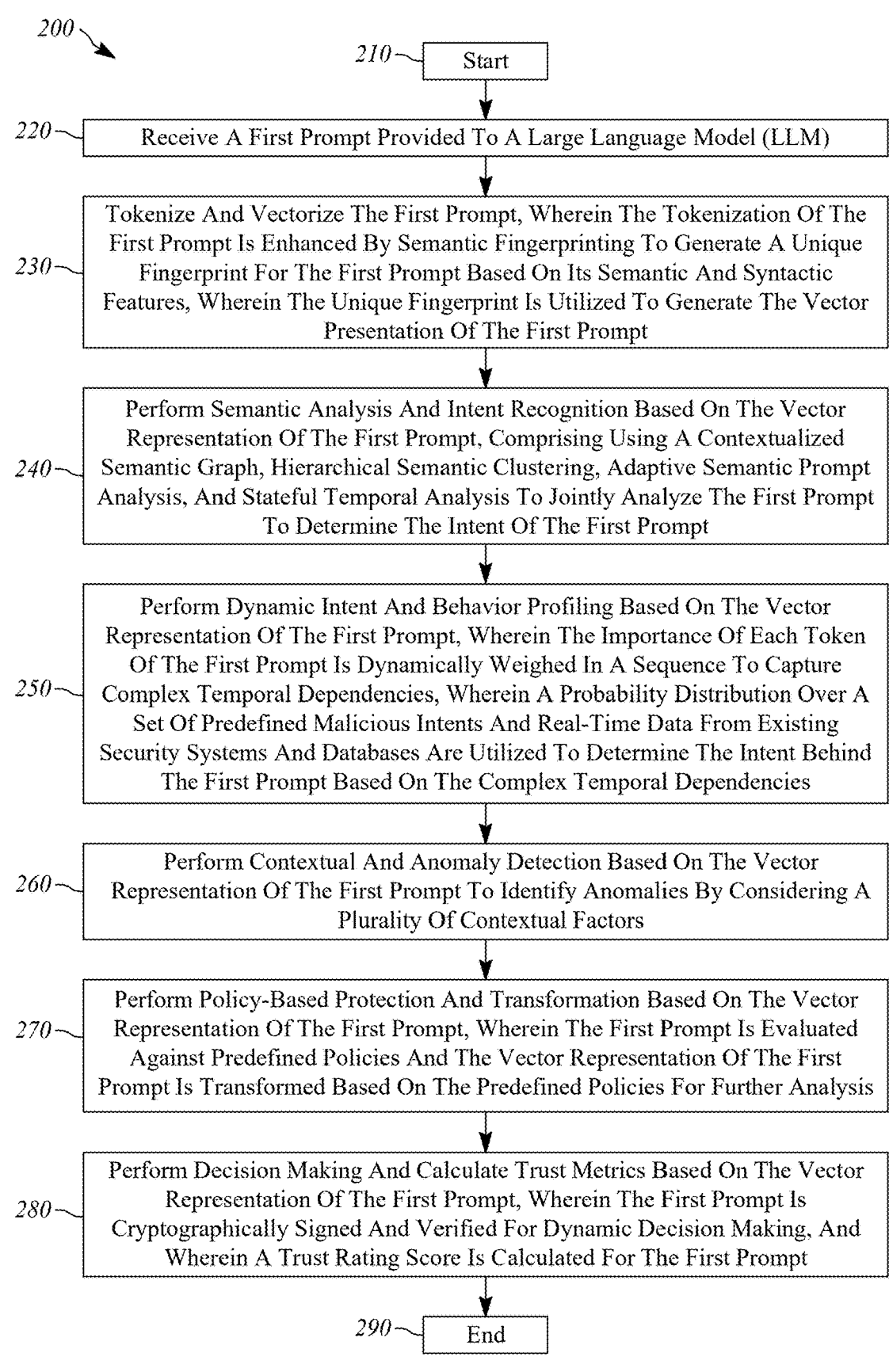

200

210 — Start

220 — Receive A First Prompt Provided To A Large Language Model (LLM)

230 — Tokenize And Vectorize The First Prompt, Wherein The Tokenization Of The First Prompt Is Enhanced By Semantic Fingerprinting To Generate A Unique Fingerprint For The First Prompt Based On Its Semantic And Syntactic Features, Wherein The Unique Fingerprint Is Utilized To Generate The Vector Presentation Of The First Prompt 240 — Perform Semantic Analysis And Intent Recognition Based On The Vector Representation Of The First Prompt, Comprising Using A Contextualized Semantic Graph, Hierarchical Semantic Clustering, Adaptive Semantic Prompt Analysis, And Stateful Temporal Analysis To Jointly Analyze The First Prompt To Determine The Intent Of The First Prompt 250 — Perform Dynamic Intent And Behavior Profiling Based On The Vector Representation Of The First Prompt, Wherein The Importance Of Each Token Of The First Prompt Is Dynamically Weighed In A Sequence To Capture Complex Temporal Dependencies, Wherein A Probability Distribution Over A Set Of Predefined Malicious Intents And Real-Time Data From Existing Security Systems And Databases Are Utilized To Determine The Intent Behind The First Prompt Based On The Complex Temporal Dependencies 260 — Perform Contextual And Anomaly Detection Based On The Vector Representation Of The First Prompt To Identify Anomalies By Considering A Plurality Of Contextual Factors 270 — Perform Policy-Based Protection And Transformation Based On The Vector Representation Of The First Prompt, Wherein The First Prompt Is Evaluated Against Predefined Policies And The Vector Representation Of The First Prompt Is Transformed Based On The Predefined Policies For Further Analysis 280 — Perform Decision Making And Calculate Trust Metrics Based On The Vector Representation Of The First Prompt, Wherein The First Prompt Is Cryptographically Signed And Verified For Dynamic Decision Making, And Wherein A Trust Rating Score Is Calculated For The First Prompt 290 — End

FIG. 2

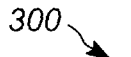
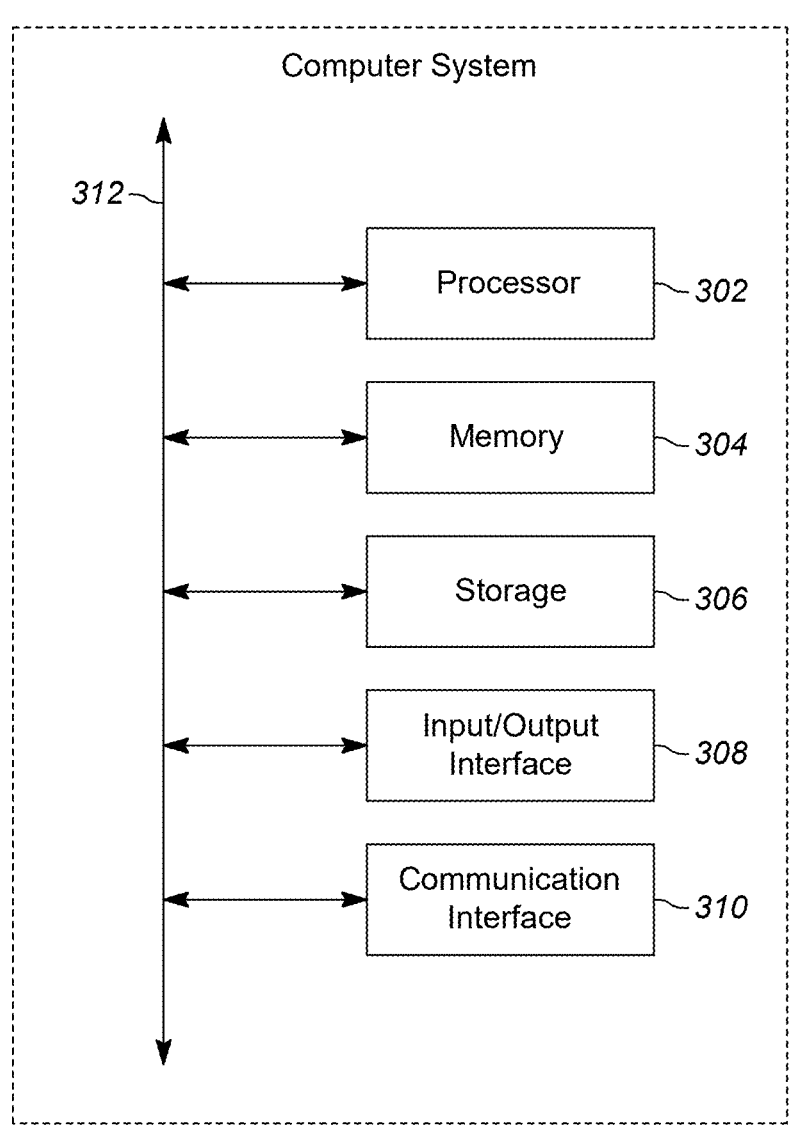
FIG. 3

SYSTEM AND METHOD FOR ADVANCED COUNTERMEASURES AGAINST PROMPT INJECTION ATTACKS IN LARGE LANGUAGE MODELS

TECHNICAL FIELD

The present disclosure generally relates to secure network communication, and more specifically to systems and methods for improving security for large language models.

BACKGROUND

A prompt is a piece of text or input that is provided to an artificial-intelligence (AI) language model to guide its responses. Prompts help dictate the machine's behavior and tell the model what to do or a specific task to perform. In other words, prompts are like conversation starters or cues that help generate the desired output from the model. They allow shaping the conversation and steering the conversation in a specific direction. When users interact with AI language models, users provide a prompt in the form of a question, sentence, or short paragraph. This specifies the desired information or the task they want the model to perform. A prompt is crucial in shaping the output generated by the language model. The prompt provides the initial context, specific instructions, or the desired format for the response. The quality and specificity of the prompt can influence the relevance and accuracy of the model's output.

A prompt injection attack can be defined as, "using carefully crafted prompts that make the model ignore previous instructions or perform unintended actions." Prompt injection attacks have emerged as a new vulnerability impacting AI models. Specifically, large-language models (LLMs) utilizing prompt-based learning are vulnerable to prompt injection attacks. Prompt injection attacks come in different forms. New terminology is emerging to describe these attacks, and the terminology continues to evolve. One type of attack involves manipulating or injecting malicious content into prompts to exploit the system. These exploits could include actual vulnerabilities, influencing the system's behavior, or deceiving users. A prompt injection attack aims to elicit an unintended response from LLM-based tools and then achieve unauthorized access, manipulate responses, or bypass security measures. The specific techniques and consequences of prompt injection attacks vary depending on the system. For example, in the context of language models, prompt injection attacks often aim to steal data.

BRIEF DESCRIPTION OF THE DRAWINGS

FIG. 2 illustrates a flow diagram of a method for advanced countermeasures against prompt injection attacks in large language models, in accordance with certain embodiments.

FIG. 3 illustrates a computer system, in accordance with certain embodiments.

DESCRIPTION OF EXAMPLE EMBODIMENTS

Overview

Figure 1A:
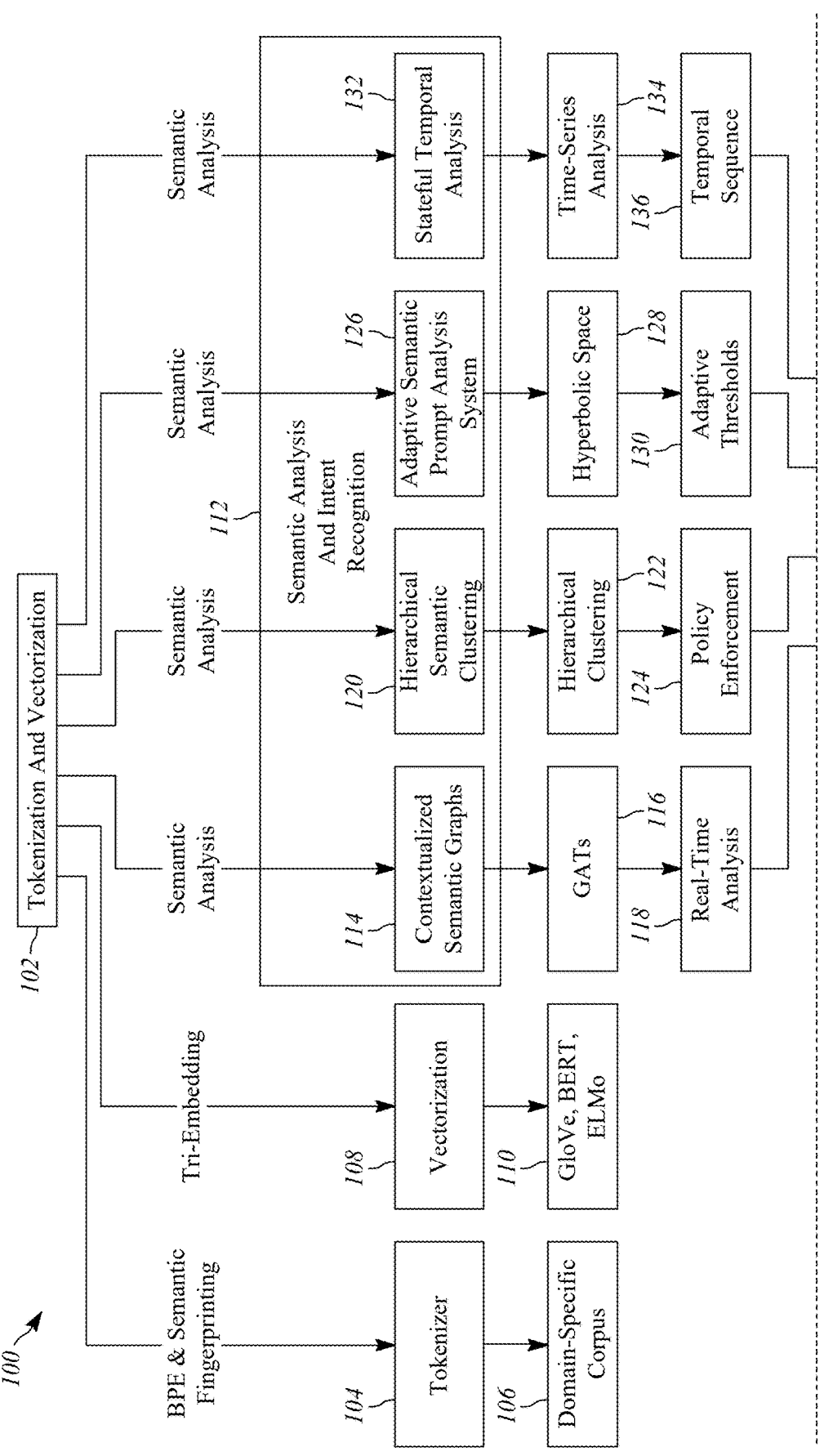
FIGS. 1A-1C illustrate a flow diagram for advanced countermeasures against prompt injection attacks in large language models, in accordance with certain embodiments.

According to an embodiment, a system may include one or more processors and one or more computer-readable non-transitory storage media comprising instructions that, when executed by the one or more processors, cause one or more components of the system to perform operations. The operations may include receiving a first prompt provided to a large language model (LLM). The operations may also include generating, based on semantic and syntactic features associated with the first prompt, a semantic fingerprint for the first prompt. The operations may additionally include generating, for the first prompt, a first vector representation incorporating the semantic fingerprint. The operations may also include calculating a plurality of semantic distances between the first vector representation and a plurality of second vector representations, respectively. The plurality of second vector representations may be associated with a plurality of malicious intents, respectively. The operations may additionally include determining, based on the plurality of semantic distances, an intent associated with the first prompt. The operations may further include determining, based on the intent and a plurality of policies, a defense action on the first prompt to mitigate a security risk associated with the first prompt.

In certain embodiments, the operations may include generating a tokenization for the first prompt. Generating the semantic fingerprint may be further based on the tokenization, and wherein generating the first vector representation is based on the tokenization.

In certain embodiments, the operations may include generating, based on the first prompt and a plurality of second prompts using one or more graph attention networks, a contextualized semantic graph comprising a first node representing the first prompt and a plurality of second nodes representing the plurality of respective second prompts. The first node may be connected to one or more of the second nodes via one or more edges. The operations may also include determining one or more respective weights associated with the one or more edges based on contextual information associated with the first prompt. The operations may also include determining one or more attention scores associated with the one or more second nodes based on the contextual information. The operations may additionally include generating a semantic analysis for the first prompt based on the one or more respective weights associated with the one or more edges and the one or more attention scores associated with the one or more second nodes. In some embodiments, determining the intent associated with the first prompt may be further based on the semantic analysis.

In certain embodiments, the operations may include generating, based on the first prompt and a plurality of second prompts using a hierarchical clustering algorithm, a multi-level semantic vector space. Each level of the multi-level semantic vector space may represent a distinct level of threat severity. In some embodiments, determining the defense action on the first prompt may be further based on the multi-level semantic vector space.

In certain embodiments, determining the intent associated with the first prompt may be further based on a threshold associated with the plurality of semantic distances. In some embodiments, the operations may include updating the threshold based on a reinforcement learning algorithm and updating the intent associated with the first prompt based on the updated threshold.

In certain embodiments, the operations may include determining a temporal sequence associated with the first prompt. The operations may also include identifying, based on an analysis of the temporal sequence by one or more time-series analysis algorithms, a pattern indicative of a state manipulation attack associated with the first prompt. In some embodiments, determining the intent associated with the first prompt may be further based on the pattern indicative of the state manipulation attack.

In certain embodiments, determining the defense action on the first prompt may be further based on an analysis of the plurality of policies by a zero-shot learning algorithm.

The plurality of policies may be configurable to be defined by one or more security analysts based on one or more of a word, a phrase, a user profile, a behavior, an intent, a trust rating score, or a vector region. One or more definitions associated with the plurality of policies may have one or more of an uncertainty or an ambiguity. In certain embodiments, the operations may include resolving, based on a fuzzy logic, the one or more of the uncertainty or the ambiguity associated with the one or more definitions associated with the plurality of policies.

In certain embodiments, the operations may include updating, based on a reinforcement learning algorithm, one or more of the plurality of policies.

In certain embodiments, the operations may include transforming the first vector representation associated with the first prompt to a first region in a semantic space. Determining the defense action on the first prompt may be further based on the first region in the semantic space.

In certain embodiments, the operations may include creating, based on a blockchain network, one or more immutable and decentralized trust metrics. The operations may also include evaluating the first prompt against the one or more immutable and decentralized trust metrics. In some embodiments, determining the defense action on the first prompt may be further based on the evaluation.

In certain embodiments, the operations may include cryptographically signing and verifying the first prompt based on a chain-of-trust verification process. Determining the defense action on the first prompt may be further based on the signing and verifying of the first prompt In certain embodiments, the operations may include generating a trust rating score for the first prompt, the trust rating score comprising a human-centric dimension enriched by one or more subject matter experts. Determining the defense action on the first prompt may be further based on the trust rating score.

According to another embodiment, a method may include receiving a first prompt provided to a large language model (LLM). The method may also include generating, based on semantic and syntactic features associated with the first prompt, a semantic fingerprint for the first prompt. The method may also include generating, for the first prompt, a first vector representation incorporating the semantic fingerprint. The method may also include calculating a plurality of semantic distances between the first vector representation and a plurality of second vector representations, respectively. The plurality of second vector representations may be associated with a plurality of malicious intents, respectively. The method may additionally include determining, based on the plurality of semantic distances, an intent associated with the first prompt. The method may further include determining, based on the intent and a plurality of policies, a defense action on the first prompt to mitigate a security risk associated with the first prompt.

According to yet another embodiment, one or more computer-readable non-transitory storage media may embody instructions that, when executed by a processor, cause the performance of operations. The operations may include receiving a first prompt provided to a large language model (LLM). The operations may also include generating, based on semantic and syntactic features associated with the first prompt, a semantic fingerprint for the first prompt. The operations may additionally include generating, for the first prompt, a first vector representation incorporating the semantic fingerprint. The operations may also include calculating a plurality of semantic distances between the first vector representation and a plurality of second vector representations, respectively. The plurality of second vector representations may be associated with a plurality of malicious intents, respectively. The operations may additionally include determining, based on the plurality of semantic distances, an intent associated with the first prompt. The operations may further include determining, based on the intent and a plurality of policies, a defense action on the first prompt to mitigate a security risk associated with the first prompt.

Technical advantages of certain embodiments of this disclosure may include one or more of the following. The systems and methods described herein may provide a rapid injection and guarantee protection against data manipulation for incoming LLM prompts. The systems and methods described herein may diverge significantly from traditional anti-spam rules built on heuristics, particularly in addressing text-based attacks like email phishing. Unlike heuristic-based systems, the systems and methods described herein employ a multi-layered, context-aware detection mechanism that includes advanced features that allow for nuanced understanding and real-time analysis of text, capturing complex temporal dependencies and semantic manipulations that could exploit LLMs. The systems and methods described herein may offer a comprehensive, adaptive, and context-aware solution for countermeasures against prompt injection attacks in LLMs. Different from conventional anti-spam technologies, the systems and methods described herein utilize sophisticated enforcement mechanisms that leverage features not commonly found in traditional anti-spam systems such as zero-shot learning (ZSL) and dynamic policy adaptation using reinforcement learning. These sophisticated enforcement mechanisms may enable the systems and methods described herein to adapt to evolving threats and handle uncertainties, making them robust against evasion techniques.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

In particular embodiments, a method for countering prompt injection attacks in large language models (LLMs) is provided. The method may use advanced techniques such as hierarchical semantic clustering (HSC), dynamic intent recognition (DIR), or any other suitable technique. The method may allow security analysts to define policies based on the semantic, syntactical, and cumulative intent of prompts. By combining the detection techniques with policy-based and other enforcement mechanisms, the method can offer a flexible and robust defense mechanism against prompt injections. In particular, the method can incorporate a multi-layered security framework aimed at mitigating prompt injection attacks in large language models (LLMs). In certain embodiments, the method may use semantic fingerprinting, contextualized semantic graphs, and stateful temporal analysis for identifying nuanced attack vectors specific to LLMs. The method may use dynamic policy adaptation and semantic isolation zones as enforcement mechanisms, which can be tailored to the unique challenges posed by LLMs.

Furthermore, the method may use blockchain to create immutable, decentralized trust metrics with human or subject matter expert (SME) intervention to add an extra layer of security and verifiability.

Figure 1B:
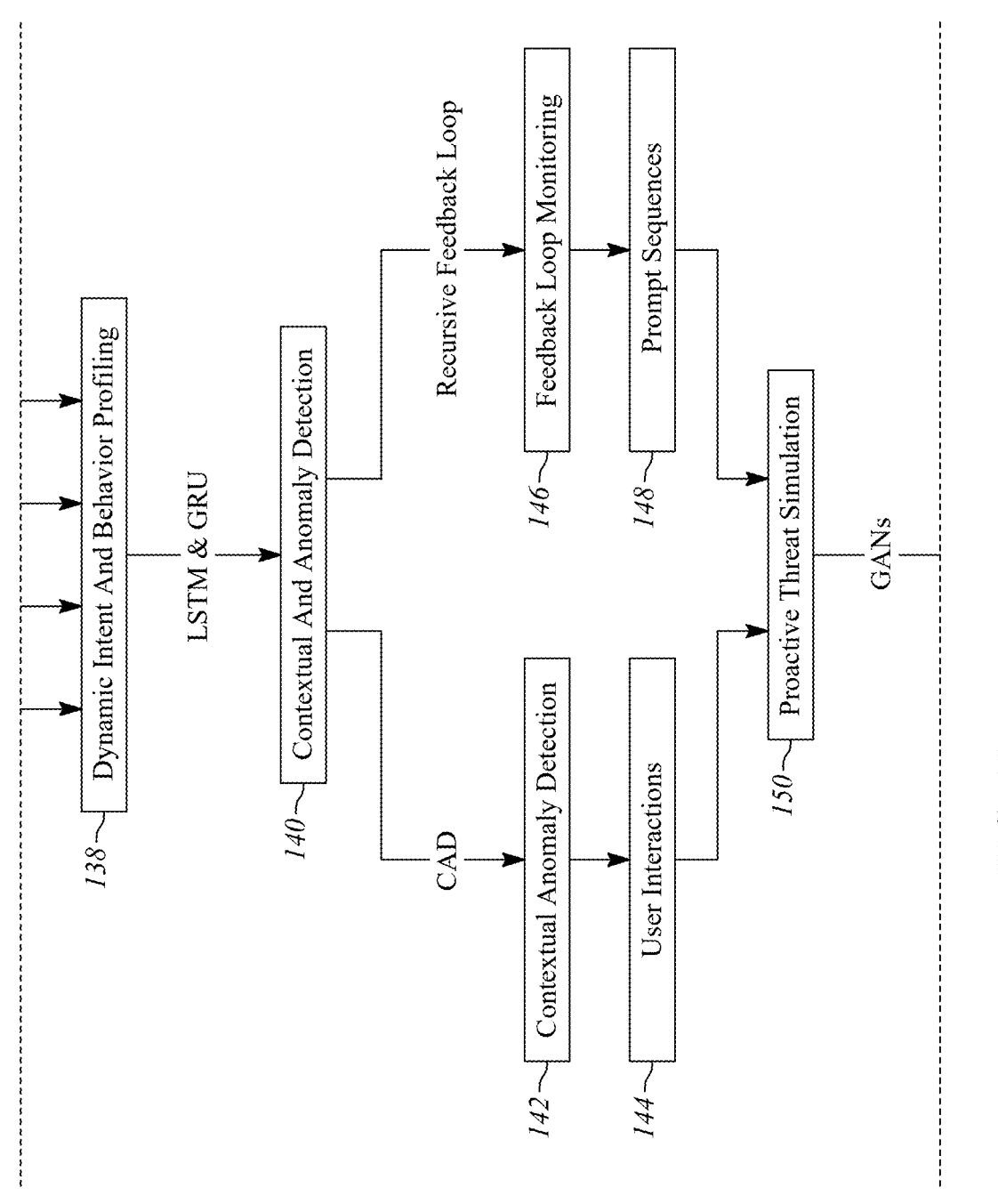
Figure 1C:
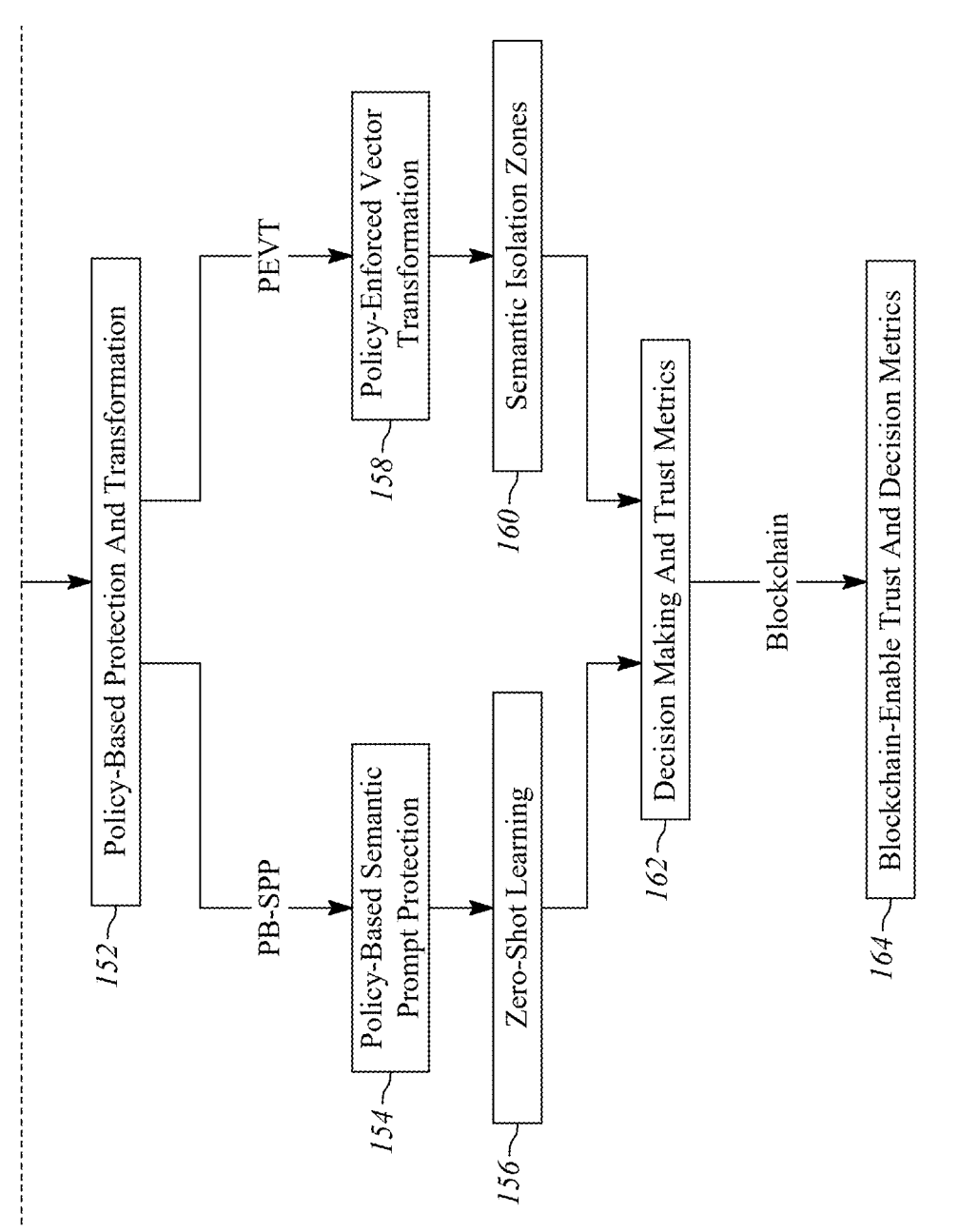

FIGS. 1A-1C illustrate a flow diagram 100 for advanced countermeasures against prompt injection attacks in large language models, in accordance with certain embodiments. In particular embodiments, the detection mechanisms may include tokenization and vectorization 102. In one embodiment, the system may employ a specialized tokenizer 104 based on byte pair encoding (BPE) algorithms, further enhanced by semantic fingerprinting to generate unique fingerprints for each prompt based on its semantic and syntactic features. The semantic fingerprinting may capture the nuanced ways in which prompts can be manipulated to exploit LLMs.

In one embodiment, the tokenizer 104 can be trained on a domain-specific corpus 106, allowing the tokenizer 104 to recognize specialized terms and jargon. A rule-based lexer can be integrated to handle edge cases such as code snippets and mathematical equations. The tokenization process may also include a named entity recognition (NER) layer, which tags sensitive or potentially malicious entities for further scrutiny. During the vectorization 108, the tokens may be then converted into vector representations using a tri-embedding strategy, incorporating GloVe, BERT, and ELMo embeddings 110. These embeddings 110 may be fine-tuned on the domain-specific corpus 106 to capture linguistic nuances effectively.

In particular embodiments, the detection mechanisms may include semantic analysis and intent recognition 112. The semantic analysis and intent recognition 112 may involve the unified semantic framework (USF), which integrates the following components.

One component may be contextualized semantic graphs (CSGs) 114. A CSG 114 may utilize graph attention networks (GATs) 116 to create a semantic graph for real-time analysis 118. The attention mechanism may allow the network to focus on semantically rich or suspicious regions of the graph. The multi-layered attention mechanism in CSGs 114 may adaptively focus on different regions of the semantic graph based on real-time data and contextual information. The edges between the nodes in the graph may be not static but dynamically weighted using real-time analytics and machine-learning algorithms. Real-time data may be continuously fed into the semantic graph, updating the nodes and initial edge weights, allowing the system to quickly respond to emerging threats or anomalies. The system can understand the context more accurately by using multiple layers of attention. The attention layers may adjust these scores based on broader contextual information. As an example and not by way of limitation, if a node represents a text prompt with potentially malicious intent, the attention scores of its neighboring nodes may be adjusted to focus more on this region of the graph. Each attention layer may have multiple heads focusing on different aspects like semantic richness, potential maliciousness, or temporal sequence. The outputs of these heads may be concatenated and passed through a linear aggregator to adjust the edge weights in the semantic graph dynamically, which allows the system to focus on semantically rich or suspicious regions adaptively.

Another component may be hierarchical semantic clustering (HSC) 120. HSC 120 may employ a hierarchical clustering algorithm 122 to create a multi-level semantic vector space, allowing for nuanced policy enforcement 124. Each level or tier may represent a different level of threat severity or type, ranging from benign to highly malicious. The process may begin with extracting semantic vectors from incoming prompts using advanced natural language processing (NLP) techniques. These vectors may be then subject to a hierarchical clustering algorithm 122 that organizes them into various clusters based on their semantic proximity. Each cluster may be further divided into subclusters, creating a tree-like structure. This hierarchical organization may allow for identifying not just individual malicious prompts but also entire categories of attacks, thereby providing a more comprehensive view of the threat landscape. Moreover, HSC 120 may incorporate real-time learning mechanisms. As new types of prompt injections are identified, the hierarchical clusters may be dynamically updated, allowing the system to adapt to emerging threats. The system ability to adapt to emerging threats may be facilitated by a feedback loop integrating flagged false positives and negatives to refine the clustering algorithm continually.

Another component may be adaptive semantic prompt analysis system (ASPAS) 126. ASPAS 126 may utilize hyperbolic space 128 for semantic distance calculations and employ a reinforcement learning-based bandit algorithm for adaptive threshold 130 updates. ASPAS 126 may also utilize the semantic distance between the embedding vector representation of the incoming prompt (or multiple fragments of the prompt for improved coverage) and predefined malicious intent vectors.

Another component may be stateful temporal analysis 132. Stateful temporal analysis 132 may keep track of the temporal sequence 136 of prompts and responses to identify patterns indicative of state manipulation attacks. Stateful temporal analysis 132 may employ advanced time-series analysis algorithms 134 specifically adapted for textual data to track the temporal sequence 136.

In particular embodiments, the detection mechanisms may include dynamic intent and behavior profiling 138. A DIR module may employ a stacked architecture of long short-term memory (LSTM) units and gated recurrent units (GRUs), augmented with a self-attention mechanism. The DIR module may dynamically weigh the importance of each token in a sequence, thereby capturing complex temporal dependencies. A probability distribution over a set of predefined malicious intents may be created and continuously updated, which is then compared in real time with the intent behind the incoming prompt. Moreover, DIR can integrate with on emerging threats and incidents, thereby enhancing its predictive accuracy. DIR can then be configured to send triggers for specific actions to the enforcement modules, such as flagging, blocking, or rerouting the prompt based on the recognized intent.

In particular embodiments, the detection mechanisms may include contextual and anomaly detection 140. A contextual anomaly detection (CAD) module may identify anomalies in the system by considering a range of contextual factors. The CAD module may utilize recurrent neural networks (RNNs) to analyze the temporal sequence of prompts for contextual anomaly detection 142, identifying patterns that could signify a coordinated attack. The system may monitor user interactions 144, including frequency, timing, and types of queries, to establish a behavioral baseline. Any deviation from this baseline may be flagged as an anomaly. The CAD module may also consider the geographical origin of the prompt, adding another layer of scrutiny. As an example and not by way of limitation, a prompt originating from a location known for cyber threats may be flagged. The contextual information may allow the system to differentiate between anomalous behavior and false positives. In addition, a recursive feedback loop may perform the feedback loop monitoring 146 between the LLM's outputs and subsequent prompt sequences 148. The recursive feedback loop may employ machine-learning models trained to recognize patterns indicative of feedback loop exploitation.

In particular embodiments, the HSC 120, DIR module, and CAD module are not limited to text-based prompts. They can be extended to understand and analyze multimodal inputs, such as voice or image-based prompts, providing a more holistic security solution.

In particular embodiments, the detection mechanisms may include proactive threat simulation 150. An adversarial prompt simulation module may employ generative adversarial networks (GANs) to simulate potential prompt injection attacks. This proactive approach may allow the system to train on simulated data, thereby improving its ability to recognize new types of attacks.

In particular embodiments, the enforcement mechanisms may include policy-based protection and transformation 152. A policy-based semantic prompt protection (PB-SPP) module may be an advanced policy enforcement system that allows security analysts to define policies based on explicit words, phrases, and vector regions. The PB-SPP module may conduct policy-based semantic prompt protection 154. The PB-SPP module may employ a zero-shot learning (ZSL) 156 approach, enabling the system to identify malicious prompts even if they use novel phrasings or synonyms that were not in the training data. The policies may be stored in a high-dimensional policy space, and a k-nearest neighbors (k-NN) algorithm may be employed to match incoming prompts against these policies. Additionally, a fuzzy logic layer may be incorporated to handle uncertainties and ambiguities in the policy definitions, making the system more robust against evasion techniques. The PB-SPP module may employ dynamic policy adaptation using reinforcement learning to adapt policies based on the evolving LLM threat landscape.

A policy-enforced vector transformation (PEVT) module may perform policy-enforced vector transformation 158. The PEVT module may not just detect but also mitigate the risk posed by suspicious prompts. Once the PB-SPP or CAD modules flag a prompt, its semantic vector may be transformed based on predefined policies. This transformation may alter the semantic space of the prompt into semantic isolation zones 160, making it easier to isolate and analyze. As an example and not by way of limitation, if a prompt is flagged as potentially harmful but not definitively, the PEVT module can transform its semantic vector to a 'neutral' or 'safe' region of the semantic space for further analysis. This dynamic alteration of the semantic space may add an extra layer of security and complexity to the system. For prompts flagged as suspicious but not definitively malicious, the system may employ semantic isolation zones where their impact on the model's state is contained.

In particular embodiments, the enforcement mechanisms may include decision making and trust metrics 162. Blockchain-enabled trust and decision metrics (BETDM) 164 may utilize blockchain technology for creating immutable, decentralized trust metrics, and employ a Pareto-optimality approach, including a chain-of-trust verification to cryptographically sign and verify each prompt and its corresponding response, and a multi-objective optimization algorithm for dynamic decision making. Trust rating score (TRS) may be a human-centric metric, enriched by subject matter experts (SMEs). SMEs may monitor trust rating events, with other party of interest overseeing the spectrum of events. The collective effort may enhance the TRS's credibility and applicability.

FIG. 2 illustrate a flow diagram of a method 200 for advanced countermeasures against prompt injection attacks in large language models, in accordance with certain embodiments. The method may start at step 210.

At step 220, a computing system may receive a first prompt provided to a large language model (LLM).

At step 230, the computing system may tokenize and vectorize the first prompt, wherein the tokenization of the first prompt is enhanced by semantic fingerprinting to generate a unique fingerprint for the first prompt based on its semantic and syntactic features, wherein the unique fingerprint is utilized to generate the vector presentation of the first prompt.

At step 240, the computing system may perform semantic analysis and intent recognition based on the vector representation of the first prompt, comprising using a contextualized semantic graph, hierarchical semantic clustering, adaptive semantic prompt analysis, and stateful temporal analysis to jointly analyze the first prompt to determine the intent of the first prompt.

At step 250, the computing system may perform dynamic intent and behavior profiling based on the vector representation of the first prompt, wherein the importance of each token of the first prompt is dynamically weighed in a sequence to capture complex temporal dependencies, wherein a probability distribution over a set of predefined malicious intents and real-time data from existing security systems and databases are utilized to determine the intent behind the first prompt based on the complex temporal dependencies.

At step 260, the computing system may perform contextual and anomaly detection based on the vector representation of the first prompt to identify anomalies by considering a plurality of contextual factors.

At step 270, the computing system may perform policy-based protection and transformation based on the vector representation of the first prompt, wherein the first prompt is evaluated against predefined policies and the vector representation of the first prompt is transformed based on the predefined policies for further analysis.

At step 280, the computing system may perform decision making and calculate trust metrics based on the vector representation of the first prompt, wherein the first prompt is cryptographically signed and verified for dynamic decision making, and wherein a trust rating score is calculated for the first prompt.

At step 290, the method may end.

Although this disclosure describes and illustrates particular steps of method 200 of FIG. 2 as occurring in a particular order, this disclosure contemplates any suitable steps of method 200 of FIG. 2 occurring in any suitable order. Although this disclosure describes and illustrates an example method for early detection of duplicate SA including the particular steps of method 200 of FIG. 2, this disclosure contemplates any suitable method for early detection of duplicate SA including any suitable steps, which may include all, some, or none of the steps of method 200 of FIG. 2, where appropriate. Furthermore, although FIG. 2 describes and illustrates particular components, devices, or systems carrying out particular actions, this disclosure contemplates any suitable combination of any suitable components, devices, or systems carrying out any suitable actions.

FIG. 3 illustrates a computer system 300, in accordance with certain embodiments. In particular embodiments, one or more computer system 300 perform one or more steps of one or more methods described or illustrated herein. In particular embodiments, one or more computer system 300 provide functionality described or illustrated herein. In particular embodiments, software running on one or more computer system 300 performs one or more steps of one or more methods described or illustrated herein or provides functionality described or illustrated herein. Particular embodiments include one or more portions of one or more computer system 300. Herein, reference to a computer system may encompass a computing device, and vice versa, where appropriate. Moreover, reference to a computer system may encompass one or more computer systems, where appropriate.

This disclosure contemplates any suitable number of computer system 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer system 300; be unitary or distributed; span multiple locations; span multiple machines; span multiple data centers; or reside in a cloud, which may include one or more cloud components in one or more networks. Where appropriate, one or more computer system 300 may perform without substantial spatial or temporal limitation one or more steps of one or more methods described or illustrated herein. As an example, and not by way of limitation, one or more computer system 300 may perform in real time or in batch mode one or more steps of one or more methods described or illustrated herein. One or more computer system 300 may perform at different times or at different locations one or more steps of one or more methods described or illustrated herein, where appropriate.

In particular embodiments, computer system 300 includes a processor 302, a memory 304, a storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory

304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer system 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments disclosed herein include a method, an apparatus, a storage medium, a system and a computer program product, wherein any feature mentioned in one category, e.g., a method, can be applied in another category, e.g., a system, as well.

13

What is claimed is:

1. A computing system, comprising:

one or more processors; and one or more computer-readable non-transitory storage media comprising instructions that, when executed by the one or more processors, cause one or more components of the computing system to perform operations comprising:

receiving a first prompt provided to a large language model (LLM);

generating, based on semantic and syntactic features associated with the first prompt, a semantic fingerprint for the first prompt;

generating, for the first prompt, a first vector representation incorporating the semantic fingerprint;

calculating a plurality of semantic distances between the first vector representation and a plurality of second vector representations, respectively, wherein the plurality of second vector representations are associated with a plurality of malicious intents, respectively;

determining, based on the plurality of semantic distances, an intent associated with the first prompt;

transforming the first vector representation associated with the first prompt to an isolated region in a semantic space configured for an extra layer of security and complexity, wherein the first prompt is transformed to the isolated region when the first prompt is flagged as suspicious; and executing a defense action on the first prompt to mitigate a security risk associated with the first prompt, wherein the defense action is determined based on a trust evaluation of the first vector representation.

2. The computing system of claim 1, the operations further comprising:

generating a tokenization for the first prompt, wherein generating the semantic fingerprint is further based on the tokenization, and wherein generating the first vector representation is based on the tokenization.

3. The computing system of claim 1, the operations further comprising:

generating, based on the first prompt and a plurality of second prompts using one or more graph attention networks, a contextualized semantic graph comprising a first node representing the first prompt and a plurality of second nodes representing the plurality of respective second prompts, wherein the first node is connected to one or more of the second nodes via one or more edges;

determining one or more respective weights associated with the one or more edges based on contextual information associated with the first prompt;

determining one or more attention scores associated with the one or more second nodes based on the contextual information; and generating a semantic analysis for the first prompt based on the one or more respective weights associated with the one or more edges and the one or more attention scores associated with the one or more second nodes;

wherein determining the intent associated with the first prompt is further based on the semantic analysis.

4. The computing system of claim 1, the operations further comprising:

generating, based on the first prompt and a plurality of second prompts using a hierarchical clustering algorithm, a multi-level semantic vector space, wherein each level of the multi-level semantic vector space represents a distinct level of threat severity, and wherein determining the defense action on the first prompt is further based on the multi-level semantic vector space.

5. The computing system of claim 1, wherein determining the intent associated with the first prompt is further based on a threshold associated with the plurality of semantic distances, the operations further comprising:

updating the threshold based on a reinforcement learning algorithm; and updating the intent associated with the first prompt based on the updated threshold.

6. The computing system of claim 1, the operations further comprising:

determining a temporal sequence associated with the first prompt; and identifying, based on an analysis of the temporal sequence by one or more time-series analysis algorithms, a pattern indicative of a state manipulation attack associated with the first prompt;

wherein determining the intent associated with the first prompt is further based on the pattern indicative of the state manipulation attack.

7. The computing system of claim 1, wherein determining the defense action on the first prompt is further based on an analysis of the plurality of policies by a zero-shot learning algorithm.

8. The computing system of claim 1, wherein the plurality of policies are configurable to be defined by one or more security analysts based on one or more of a word, a phrase, a user profile, a behavior, an intent, a trust rating score, or a vector region.

9. The computing system of claim 8, wherein one or more definitions associated with the plurality of policies have one or more of an uncertainty or an ambiguity, the operations further comprising:

resolving, based on a fuzzy logic, the one or more of the uncertainty or the ambiguity associated with the one or more definitions associated with the plurality of policies.

10. The computing system of claim 1, the operations further comprising:

updating, based on a reinforcement learning algorithm, one or more of the plurality of policies.

11. The computing system of claim 1, wherein determining the defense action on the first prompt is further based on the isolated region in the semantic space.

12. The computing system of claim 1, the operations further comprising:

creating, based on a blockchain network, one or more immutable and decentralized trust metrics; and evaluating the first prompt against the one or more immutable and decentralized trust metrics;

wherein determining the defense action on the first prompt is further based on the evaluation.

13. The computing system of claim 1, the operations further comprising:

cryptographically signing and verifying the first prompt based on a chain-of-trust verification process;

wherein determining the defense action on the first prompt is further based on the signing and verifying of the first prompt.

14. The computing system of claim 1, the operations further comprising:

generating a trust rating score for the first prompt, the trust rating score comprising a human-centric dimension enriched by one or more subject matter experts;

wherein determining the defense action on the first prompt is further based on the trust rating score.

15. A method, comprising:

receiving a first prompt provided to a large language model (LLM);

generating, based on semantic and syntactic features associated with the first prompt, a semantic fingerprint for the first prompt;

generating, for the first prompt, a first vector representation incorporating the semantic fingerprint;

calculating a plurality of semantic distances between the first vector representation and a plurality of second vector representations, respectively, wherein the plurality of second vector representations are associated with a plurality of malicious intents, respectively;

determining, based on the plurality of semantic distances, an intent associated with the first prompt;

transforming the first vector representation associated with the first prompt to an isolated region in a semantic space configured for an extra layer of security and complexity, wherein the first prompt is transformed to the isolated region when the first prompt is flagged as suspicious; and executing a defense action on the first prompt to mitigate a security risk associated with the first prompt, wherein the defense action is determined based on a trust evaluation of the first vector representation.

16. The method of claim 15, further comprising:

generating, based on the first prompt and a plurality of second prompts using one or more graph attention networks, a contextualized semantic graph comprising a first node representing the first prompt and a plurality of second nodes representing the plurality of respective second prompts, wherein the first node is connected to one or more of the second nodes via one or more edges;

determining one or more respective weights associated with the one or more edges based on contextual information associated with the first prompt;

determining one or more attention scores associated with the one or more second nodes based on the contextual information; and generating a semantic analysis for the first prompt based on the one or more respective weights associated with the one or more edges and the one or more attention scores associated with the one or more second nodes;

wherein determining the intent associated with the first prompt is further based on the semantic analysis.

17. The method of claim 15, further comprising:

generating, based on the first prompt and a plurality of second prompts using a hierarchical clustering algorithm, a multi-level semantic vector space, wherein each level of the multi-level semantic vector space represents a distinct level of threat severity, and wherein determining the defense action on the first prompt is further based on the multi-level semantic vector space.

18. A non-transitory computer-readable medium comprising instructions that are configured, when executed by a processor, to perform operations comprising:

receiving a first prompt provided to a large language model (LLM);

generating, based on semantic and syntactic features associated with the first prompt, a semantic fingerprint for the first prompt;

generating, for the first prompt, a first vector representation incorporating the semantic fingerprint;

calculating a plurality of semantic distances between the first vector representation and a plurality of second vector representations, respectively, wherein the plurality of second vector representations are associated with a plurality of malicious intents, respectively;

determining, based on the plurality of semantic distances, an intent associated with the first prompt;

transforming the first vector representation associated with the first prompt to an isolated region in a semantic space configured for an extra layer of security and complexity, wherein the first prompt is transformed to the isolated region when the first prompt is flagged as suspicious; and executing a defense action on the first prompt to mitigate a security risk associated with the first prompt, wherein the defense action is determined based on a trust evaluation of the first vector representation.

19. The non-transitory computer-readable medium of claim 18, the operations further comprising:

generating, based on the first prompt and a plurality of second prompts using one or more graph attention networks, a contextualized semantic graph comprising a first node representing the first prompt and a plurality of second nodes representing the plurality of respective second prompts, wherein the first node is connected to one or more of the second nodes via one or more edges;

determining one or more respective weights associated with the one or more edges based on contextual information associated with the first prompt;

determining one or more attention scores associated with the one or more second nodes based on the contextual information; and generating a semantic analysis for the first prompt based on the one or more respective weights associated with the one or more edges and the one or more attention scores associated with the one or more second nodes;

wherein determining the intent associated with the first prompt is further based on the semantic analysis.

20. The non-transitory computer-readable medium of claim 18, the operations further comprising:

generating, based on the first prompt and a plurality of second prompts using a hierarchical clustering algorithm, a multi-level semantic vector space, wherein each level of the multi-level semantic vector space represents a distinct level of threat severity, and wherein determining the defense action on the first prompt is further based on the multi-level semantic vector space.

* * * * *